(12) United States Patent
Mahajan et al.

(10) Patent No.: US 12,439,037 B2
(45) Date of Patent: Oct. 7, 2025

(54) AREA OPTIMIZED STORAGE SCHEME FOR CROSS-COMPONENT ADAPTIVE LOOP FILTERING

(71) Applicant: QUALCOMM Incorporated, San Diego, CA (US)

(72) Inventors: Vikrant Mahajan, Dinanagar (IN); Krishna Murthy, Bengaluru (IN); Sandeep Nellikatte Srivatsa, Bangalore (IN); Ashish Mishra, Bhubaneswar (IN)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 18/145,626

(22) Filed: Dec. 22, 2022

(65) Prior Publication Data

US 2024/0214564 A1     Jun. 27, 2024

(51) Int. Cl.
*H04N 19/117* (2014.01)
*H04N 19/176* (2014.01)
*H04N 19/186* (2014.01)
*H04N 19/82* (2014.01)

(52) U.S. Cl.
CPC ......... *H04N 19/117* (2014.11); *H04N 19/176* (2014.11); *H04N 19/186* (2014.11); *H04N 19/82* (2014.11)

(58) Field of Classification Search
None
See application file for complete search history.

(56) References Cited

U.S. PATENT DOCUMENTS

| 9,860,530 B2 | 1/2018 | Lee et al. |
| 2014/0056355 A1* | 2/2014 | Li ............ H04N 19/127 375/E7.243 |

(Continued)

FOREIGN PATENT DOCUMENTS

| CA | 3162821 A1 * | 7/2021 | ........... H04N 19/117 |
| CN | 103891277 A * | 6/2014 | ....... H04N 19/00266 |

(Continued)

OTHER PUBLICATIONS

International Search Report and Written Opinion—PCT/US2023/081199—ISA/EPO—Mar. 6, 2024.

(Continued)

*Primary Examiner* — Stefan Gadomski
(74) *Attorney, Agent, or Firm* — QUALCOMM Incorporated; Espartaco Diaz Hidalgo

(57) ABSTRACT

Systems and techniques are described herein for processing video data. For instance, a process can include obtaining a block of luma information for a block of video data. The process can further include applying a sample adaptive offset (SAO) filter to the luma information to generate SAO filtered luma information, inputting the SAO filtered luma information to a cross-component adaptive loop filter (CC-ALF) without storing the SAO filtered luma information to an external memory, applying the CC-ALF to the SAO filtered luma information to generate a first chroma CC-ALF output and a second chroma CC-ALF output, and storing the first chroma CC-ALF output and the second chroma CC-ALF output in the external memory.

30 Claims, 7 Drawing Sheets

(56) References Cited

U.S. PATENT DOCUMENTS

| | | | |
|---|---|---|---|
| 2014/0341287 A1* | 11/2014 | Mody | H04N 19/82 |
| | | | 375/240.13 |
| 2016/0241880 A1* | 8/2016 | Chao | H04N 19/86 |
| 2021/0084295 A1* | 3/2021 | Chen | H04N 19/70 |
| 2021/0084340 A1* | 3/2021 | Li | H04N 19/46 |
| 2021/0152841 A1* | 5/2021 | Hu | H04N 19/186 |
| 2021/0306672 A1* | 9/2021 | Bossen | H04N 19/117 |
| 2022/0030232 A1* | 1/2022 | Hu | H04N 19/86 |
| 2022/0109853 A1 | 4/2022 | Zhang et al. | |
| 2022/0109889 A1* | 4/2022 | Zhang | H04N 19/46 |
| 2022/0210453 A1 | 6/2022 | Fan et al. | |
| 2022/0256145 A1* | 8/2022 | Huang | H04N 19/117 |
| 2022/0264106 A1* | 8/2022 | Zhang | H04N 19/136 |
| 2022/0295075 A1 | 9/2022 | Xu et al. | |
| 2022/0303529 A1* | 9/2022 | Lai | H04N 19/186 |
| 2022/0303584 A1* | 9/2022 | Du | H04N 19/86 |
| 2022/0329794 A1* | 10/2022 | Kotra | H04N 19/117 |
| 2022/0377326 A1* | 11/2022 | Kotra | H04N 19/117 |
| 2022/0394281 A1* | 12/2022 | Zhang | H04N 19/105 |
| 2023/0031886 A1* | 2/2023 | Chen | H04N 19/186 |
| 2023/0069756 A1* | 3/2023 | Wang | H04N 19/70 |
| 2023/0156186 A1* | 5/2023 | Wang | H04N 19/117 |
| | | | 375/240.02 |
| 2023/0412828 A1* | 12/2023 | Du | H04N 19/82 |
| 2024/0064298 A1* | 2/2024 | Zhang | H04N 19/46 |
| 2024/0171736 A1* | 5/2024 | Du | H04N 19/167 |

FOREIGN PATENT DOCUMENTS

| | | |
|---|---|---|
| WO | 2012152174 A1 | 11/2012 |
| WO | 2022178424 A1 | 8/2022 |

OTHER PUBLICATIONS

Yasugi Y., et al., "CE5-related: Clipping of intermediate value in CC-ALF", Joint Video Experts Team (JVET) of ITU-T SG 16 WP 3 and ISO/IEC JTC 1/SC 29/WG 11, JVET-P0290, 16. JVET Meeting; Oct. 1-Oct. 11, 2019, Geneva, No. JVET-P0290, Sep. 24, 2019, 4 Pages, XP030216832, abstract, sections 1 and 2, figure 1.

* cited by examiner

AREA OPTIMIZED STORAGE SCHEME FOR CROSS-COMPONENT ADAPTIVE LOOP FILTERING

TECHNICAL FIELD

This application is generally related to video processing. For example, aspects of the application relate to improving video coding techniques (e.g., encoding and/or decoding video) with respect to an area optimized storage scheme for filtering using a cross-component adaptive loop filter (CC-ALF).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Digital video devices can implement video coding techniques to compress video data. Video coding is performed according to one or more video coding standards or formats. For example, video coding standards or formats include versatile video coding (VVC), high-efficiency video coding (HEVC), advanced video coding (AVC), MPEG-2 Part 2 coding (MPEG stands for moving picture experts group), Essential Video Coding (EVC), among others, as well as proprietary video coder-decoder (codecs)/formats such as AOMedia Video 1 (AV1) that was developed by the Alliance for Open Media. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. With ever-evolving video services becoming available, coding and decoding techniques that can improve efficiency or reduce hardware costs are needed.

SUMMARY

Systems and techniques are described herein for processing video data. According to at least one example, an apparatus for processing video data is provided. The apparatus includes at least one memory and at least one processor (e.g., configured in circuitry) coupled to the at least one memory. The at least one processor is configured to: obtain a block of luma information for a block of video data; apply a sample adaptive offset (SAO) filter to the luma information to generate SAO filtered luma information; input the SAO filtered luma information to a cross-component adaptive loop filter (CC-ALF) without storing the SAO filtered luma information to an external memory; apply the CC-ALF to the SAO filtered luma information to generate a first chroma CC-ALF output and a second chroma CC-ALF output; and store the first chroma CC-ALF output and the second chroma CC-ALF output in the external memory.

As another example, a method for processing video data is provided. The method includes: obtaining a block of luma information for a block of video data; applying a sample adaptive offset (SAO) filter to the luma information to generate SAO filtered luma information; inputting the SAO filtered luma information to a cross-component adaptive loop filter (CC-ALF) without storing the SAO filtered luma information to an external memory; applying the CC-ALF to the SAO filtered luma information to generate a first chroma CC-ALF output and a second chroma CC-ALF output; and storing the first chroma CC-ALF output and the second chroma CC-ALF output in the external memory.

In another example, non-transitory computer-readable medium is provided, having stored thereon instructions that can be executed by at least one processor. The instructions cause the at least one processor to: obtain a block of luma information for a block of video data; apply a sample adaptive offset (SAO) filter to the luma information to generate SAO filtered luma information; input the SAO filtered luma information to a cross-component adaptive loop filter (CC-ALF) without storing the SAO filtered luma information to an external memory; apply the CC-ALF to the SAO filtered luma information to generate a first chroma CC-ALF output and a second chroma CC-ALF output; and store the first chroma CC-ALF output and the second chroma CC-ALF output in the external memory.

As another example, an apparatus for processing video data is provided. The apparatus includes: means for obtaining a block of luma information for a block of video data; means for applying a sample adaptive offset (SAO) filter to the luma information to generate SAO filtered luma information; means for inputting the SAO filtered luma information to a cross-component adaptive loop filter (CC-ALF) without storing the SAO filtered luma information to an external memory; means for applying the CC-ALF to the SAO filtered luma information to generate a first chroma CC-ALF output and a second chroma CC-ALF output; and means for storing the first chroma CC-ALF output and the second chroma CC-ALF output in the external memory.

In another example, an apparatus for processing video data is provided. The apparatus includes: at least one memory; and at least one processor coupled to the at least one memory, the at least one processor being configured to: obtain a block of luma information for a block of video data; apply a sample adaptive offset (SAO) filter to the luma information to generate SAO filtered luma information; input the SAO filtered luma information to a cross-component adaptive loop filter (CC-ALF) without storing the SAO filtered luma information to an external memory; apply the CC-ALF to the SAO filtered luma information to generate at least one chroma CC-ALF output; and store the at least one chroma CC-ALF output in the external memory.

As another example, method for processing video data is provided. The method includes: obtaining a block of luma information for a block of video data; applying a sample adaptive offset (SAO) filter to the luma information to generate SAO filtered luma information; inputting the SAO filtered luma information to a cross-component adaptive loop filter (CC-ALF) without storing the SAO filtered luma information to an external memory; applying the CC-ALF to the SAO filtered luma information to generate at least one chroma CC-ALF output; and storing the at least one chroma CC-ALF output in the external memory.

In another example, a non-transitory computer-readable medium is provided. The non-transitory medium having stored thereon instructions that, when executed by at least one processor, cause the at least one processor to: obtain a block of luma information for a block of video data; apply a sample adaptive offset (SAO) filter to the luma information to generate SAO filtered luma information; input the SAO filtered luma information to a cross-component adaptive loop filter (CC-ALF) without storing the SAO filtered luma information to an external memory; apply the CC-ALF to the SAO filtered luma information to generate at least one chroma CC-ALF output; and store the at least one chroma CC-ALF output in the external memory.

As another example, an apparatus for processing video data is provided. The apparatus include: means for obtaining a block of luma information for a block of video data; means for applying a sample adaptive offset (SAO) filter to the luma information to generate SAO filtered luma information; means for inputting the SAO filtered luma information to a cross-component adaptive loop filter (CC-ALF) without storing the SAO filtered luma information to an external memory; means for applying the CC-ALF to the SAO filtered luma information to generate at least one chroma CC-ALF output; and means for storing the at least one chroma CC-ALF output in the external memory.

In some aspects, one or more of the apparatuses or devices described herein is, is part of, and/or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a camera, a personal computer, a laptop computer, a server computer, a vehicle or a computing device or component of a vehicle, a robotics device or system, a television, or other device. In some aspects, the apparatuses or devices include a camera or multiple cameras for capturing one or more pictures, images, or frames. In some aspects, the apparatuses or devices include a display for displaying one or more images, notifications, and/or other displayable data. In some aspects, the apparatuses or devices can include one or more sensors (e.g., one or more inertial measurement units (IMUs), such as one or more gyroscopes, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
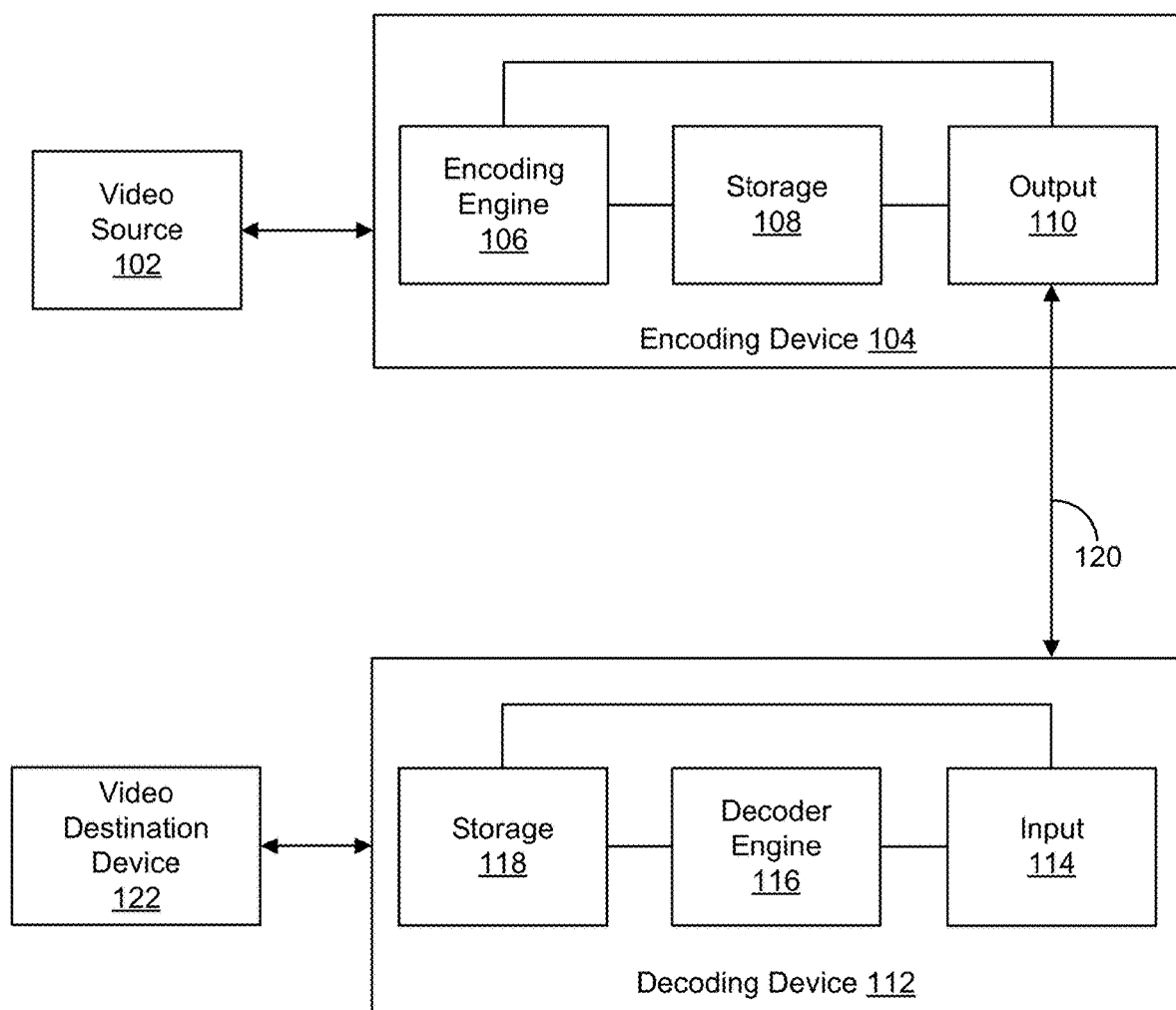
FIG. 1 is a block diagram illustrating an example of an encoding device and a decoding device, in accordance with some aspects of the disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements and, along with control information, form a coded representation of a video sequence. In some instances, the video encoder may entropy code syntax elements, thereby further reducing the number of bits needed for their representation.

A video decoder may construct, using the syntax elements and control information discussed above, predictive data (e.g., a predictive block) for decoding a current frame. For example, the video decoder may add (e.g., merge) the predicted block and the compressed prediction error. The video decoder may determine the compressed prediction error by weighting the transform basis functions using the quantized coefficients. The difference between the reconstructed frame and the original frame is called reconstruction error.

In some cases, Versatile Video Coding (VVC) may apply adaptive loop filtering (ALF) to help improve coding efficiency. A final output of ALF in VVC may be based on information from two other filters, a chroma ALF and a cross-component ALF (CC-ALF) filter. The ALF may be a filter for minimizing an error (e.g., a mean square error, etc.) between original samples and the CC-ALF may perform the filtering across components, such as by analyzing a component, (e.g., luma channel) for aspects of another component (e.g., chroma residual). In some cases, performing filtering across components helps exploit correlations across those components. While discussed in the context of VVC, it should be understood that the techniques discussed herein may be applicable to any implementation of CC-ALF where one component for the CC-ALF processing is available before another component for the CC-ALF processing. In the example discussed herein, the CC-ALF takes, as input, luma pixels from a block (e.g., a coding tree unit (CTU)) being processed, as well as one or more coefficients specified in the bit-stream for controlling the CC-ALF process. In some cases, such as for chroma separate tree (CST) cases, luma pixels are processed in a coding pipeline before chroma pixels are processed. For example, the luma pixels may be filtered, such as by a sample adaptive offset (SAO) prior to processing the chroma information. As indicated above, the SAO filtered luma information may be input to the CC-ALF filter for processing the chroma information. To accommodate the later occurring chroma information processing, the luma information may be stored in an external memory separate from the output of the luma SAO filter (e.g., a memory, such as cache memory, separate from output registers associated with circuits performing filtering). A luma CTU may have a size up to 128×128 pixels, with up to 10 bits per pixel and thus at least 20 Kilobytes (KB) of external memory (e.g., cache) may be used to store one CTU worth of luma pixels. As cache memory may be relatively expensive, and potentially take up a significant amount of circuit space, there may be a desire to reduce an amount of memory used to perform ALF.

Systems, apparatuses, electronic devices, methods (also referred to as processes), and computer-readable media (collectively referred to herein as "systems and techniques") are described herein for optimizing storage for CC-ALF filtering. For example, the output of the luma SAO filter may be directly passed into the CC-ALF filter without storing the output of the luma SAO filter into the memory separate from the output of the luma SAO filter. The CC-ALF filter may then operate on luma SAO filtered information to generate per chroma channel (e.g., chroma blue and chroma red channels) CC-ALF filtered chroma information. This per chroma channel CC-ALF filtered chroma information may then be stored in one or more external memories for later use to generate the final output of the ALF.

In some cases, the per chroma channel CC-ALF filtered chroma information may be chroma sub-sampled. This sub-sampling may reduce the size of the per chroma channel CC-ALF filtered chroma information as compared to the luma SAO filtered information. For example, the per chroma channel CC-ALF filtered chroma information may have a chroma CTU size of 64×64 pixels, as compared to the luma SAO filtered CTU size of 128×128. The sub-sampled chroma information thus may have a size of 5 KB per chroma channel, for a total size of 10 KB of external storage.

The systems and techniques described herein can provide various advantages. For example, by optimizing storage for CC-ALF filtering, the systems and techniques can reduce memory bandwidth and save area required for physical memory by reducing the memory size. In one illustrative example, the CC-ALF memory requirement can be reduced by 50% (e.g., from 20 KB to 10 KB). In another example, for a 60 frame-per-second (FPS) video with frames that are 8,000 pixels high and 8,000 pixels wide (8K height×8K width), memory read bandwidth can be reduced from 20×8192×8192×10×60 bits/second to 5×8192×8192×10×60 bits/second (a 75% memory bandwidth reduction).

The systems and techniques described herein can be applied to any of the existing video codecs, such as Versatile Video Coding (VVC), High Efficiency Video Coding (HEVC), Advanced Video Coding (AVC), Essential Video Coding (EVC), VP9, the AV1 format/codec, and/or other video coding standard, codec, format, etc. in development or to be developed.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), EVC, VP9, AV1, extensions thereof, or other suitable coding standards already available or not yet available or developed. For instance, in some examples, the encoding device 104 and/or the decoding device 112 may operate according to a proprietary video codec/format, such as AV1, extensions of AV1, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some implementations, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape.

Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, video encoder engine 106 and video decoder engine 116 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder engine 106 may further partition a superblock into smaller coding blocks. Video encoder engine 106 may partition a superblock and other coding blocks into smaller blocks using square or non-square partitioning. Non-square blocks may include N/2×N, N×N/2, N/4×N, and N×N/4 blocks. Video encoder engine 106 and video decoder engine 116 may perform separate prediction and transform processes on each of the coding blocks.

AV1 also defines a tile of video data. A tile is a rectangular array of superblocks that may be coded independently of other tiles. That is, video encoder engine 106 and video decoder engine 116 may encode and decode, respectively, coding blocks within a tile without using video data from other tiles. However, video encoder engine 106 and video decoder engine 116 may perform filtering across tile boundaries. Tiles may be uniform or non-uniform in size. Tile-based coding may enables parallel processing and/or multi-threading for encoder and decoder implementations.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning, QTBT partitioning, MTT partitioning, superblock partitioning, or other partitioning structure.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a current block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder engine 106 and video decoder engine 116 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), ultra-wideband (UWB), WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a current block of pixels (e.g., a PU). In some examples, the prediction is merged to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not)

depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

Figure 2:
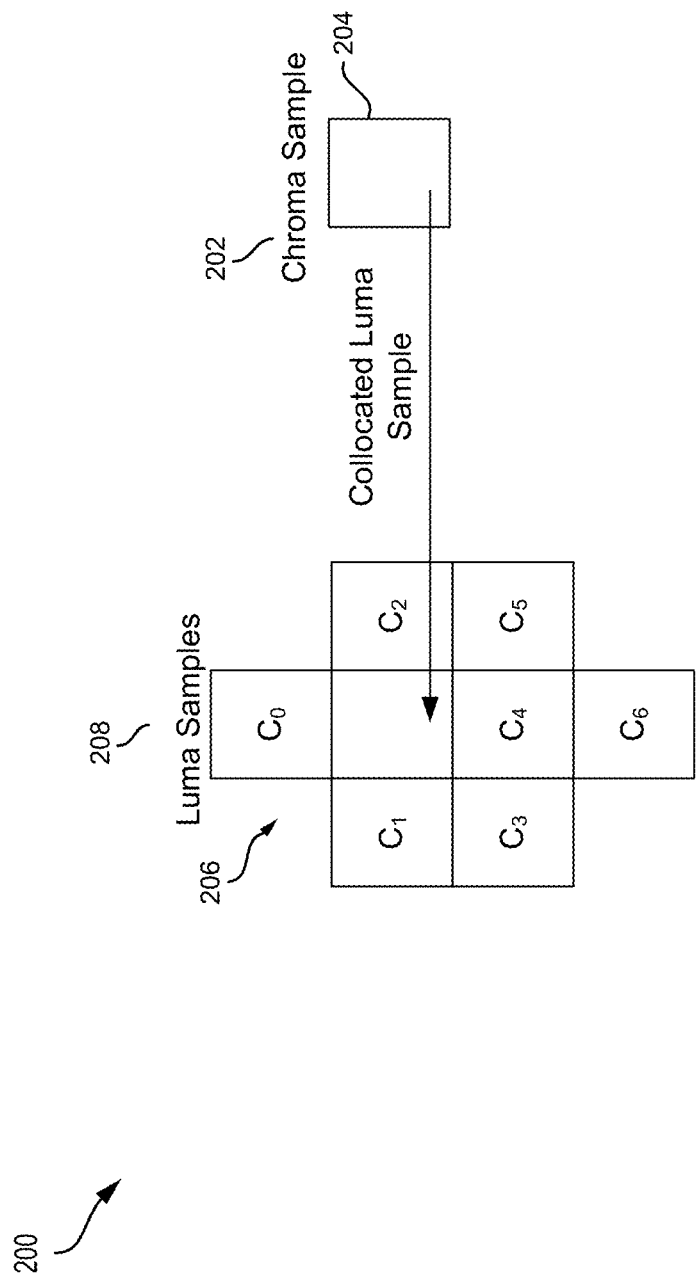
FIG. 2 is a diagram of example information for ALF filtering, in accordance with aspects of the present disclosure.

FIG. 2 is a diagram 200 of example information for ALF filtering, in accordance with aspects of the present disclosure. As noted above, ALF filtering may be applied to help improve coding efficiency. ALF filtering may be based on information from a chroma ALF filter and a CC-ALF filter. In some cases, the chroma ALF filter may use a chroma sample 202 of a pixel 204 being filtered. The CC-ALF filter may use a 3×4 diamond filter 206 shape with eight filter coefficients based on luma samples 208. In some cases, the CC-ALF filter may use other sized and/or shaped filters along with other numbers of filter coefficients. For example, the CC-ALF filter may use a square shaped, 4×4 filter shape with 7 filter coefficients, or a 7×7 diamond shape filter. The luma samples 208 include a luma sample from a pixel 204 (which can be referred to as a collocated luma sample relative to the chroma sample 202 of the pixel 204) and luma samples from seven pixels neighboring the pixel 204. The CC-ALF filter may filter the luma samples based on coefficients specified in a video bitstream. The CC-ALF filter may be based on correlations between luma and chroma samples and may be used to refine output generated by the chroma ALF filter.

The CC-ALF sum for chroma blue (CB) of a pixel at a location (x, y) (e.g., location $R_{CB}(x,y)$) may be calculated based on the equation Sum $(R_{CB}(x,y))=(\Sigma_{i=0}^{6} c_i*(R_Y(x'+xi, y'+yi)-R_Y(x', y'))+64)>>7$, where $R_Y(x', y')$ is a collocated luma sample for the CB pixel at (x, y), where ci is the CC-ALF coefficient for CB specified in the bitstream, $R_Y$ is an SAO filtered pixel value for luma, and $R_{CB}$ is an SAO filtered pixel value for CB. In cases where there are 10 bits per pixel, the CB CC-ALF sum may be clipped from −512 to 511 based on an equation Scaled_Sum$(R_{CB}(x, y))$=Clip(−512,511, Sum$(R_{CB}(x, y))$). A final CB ALF filtered output may be based on the equation $R'_{CB}(x, y)$=Chroma ALF $(R_{CB}(x, y))$+Scaled_Sum$(R_{CB}(x, y))$.

Similarly, the CC-ALF sum for chroma red (CR) of the pixel at a location (x, y) (e.g., location $R_{CR}(x, y)$) may be calculated based on the equation $\Delta R_{CR}(x, y) = (\Sigma_{i=0}^{6} ci*(R_Y(x'+xi, y'+yi)-R_Y(x', y'))+64)>>7$, where $\Delta R_{CR}$ represents a CC-ALF $\Delta$ for CR pixels values at (x, y). The CR CC-ALF sum may be clipped from −512 to 511 based on an equation Scaled_Sum$(R_{CR}(x, y))$=Clip(−512,511, Sum$(R_{CR}(x, y))$). A final CB ALF filtered output may be based on the equation $R'_{CR}(x, y)$=Chroma_ALF$(R_{Cr}(x, y))$+Scaled_Sum$(R_{Cr}(x, y))$.

Figure 3:
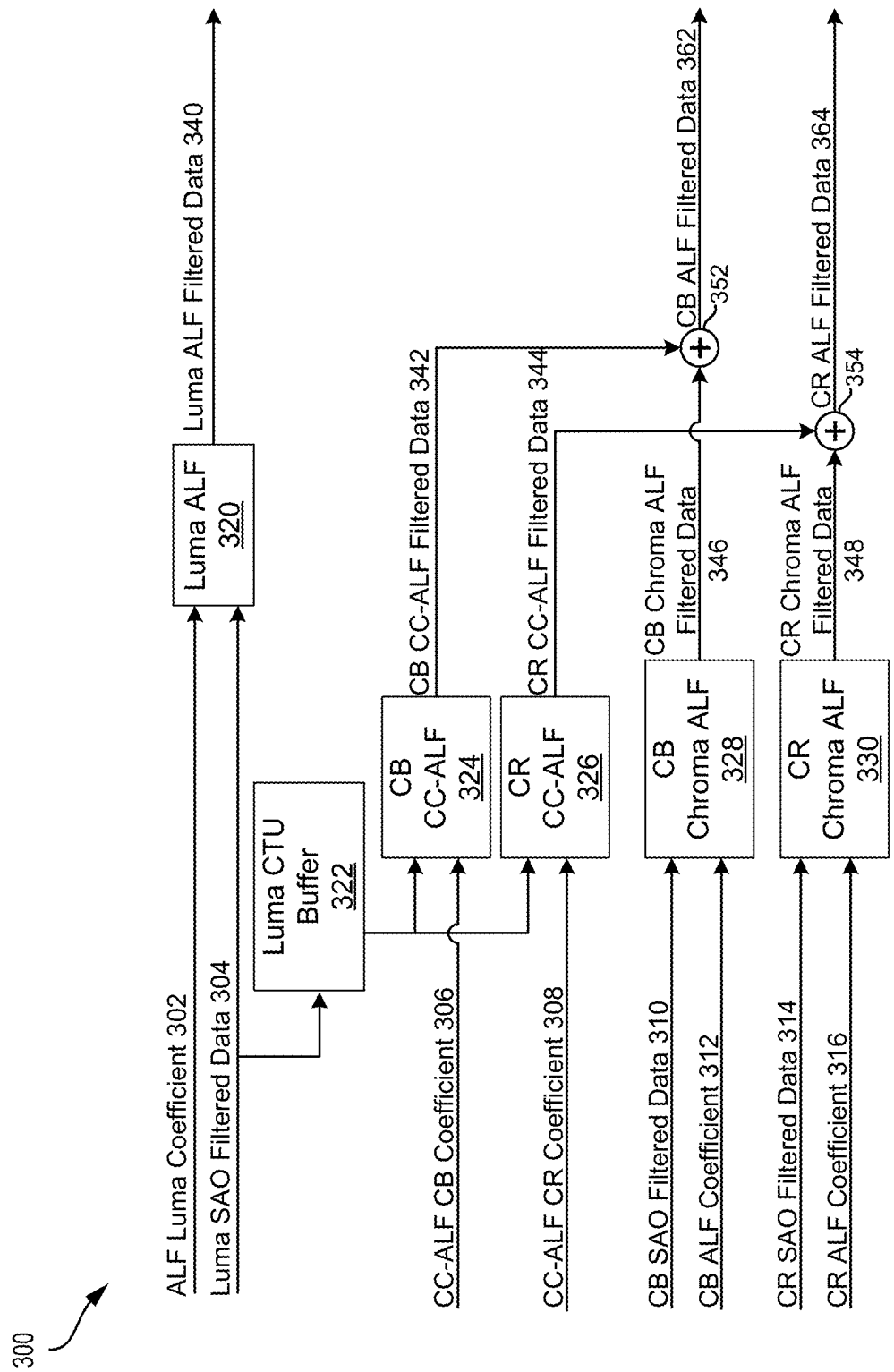
FIG. 3 is a block diagram illustrating an example ALF filter.

FIG. 3 is a block diagram 300 illustrating an example ALF filter. As indicated above, ALF filtered data may be based on summed CC-ALF data and chroma ALF data. In diagram 300, luma SAO filtered data 304 and one or more CC-ALF CB coefficients 306 may be received by a CB CC-ALF filter 324 and used to generate CB CC-ALF filtered data 342. Similarly, luma SAO filtered data 304 and one or more CC-ALF CR coefficients 308 may be received by a CR CC-ALF filter 326 and used to generate CR CC-ALF filtered data 344. One or more CB ALF coefficients 312 and CB SAO filtered data 310 may be passed into a CB chroma ALF filter 328 to generate CB chroma ALF filtered data 346. Similarly, one or more CR ALF coefficients 316 and CR SAO filtered data 314 may be passed into a CR chroma ALF filter 330 to generate CR chroma ALF filtered data 348. The CB CC-ALF filtered data 342 may then be summed 352 with the CB chroma ALF filtered data 346 to produce CB ALF filtered data 362. Similarly, the CR CC-ALF filtered data 344 may then be summed 354 with the CR chroma ALF filtered data 348 to produce CR ALF filtered data 364. Additionally, one or more ALF luma coefficients 302 and the luma SAO filtered data 304 may be passed to a luma ALF filter 320 to produce luma ALF filtered data 340.

In cases where luma pixel information is interspersed with chroma pixel information in a CTU, applying the CB/CR CC-ALF filters 324, 326 and CB/CR chroma ALF filters 328, 330 can be performed substantially in parallel. This allows the CB/CR CC-ALF filtered data 342, 344 and CB/CR chroma ALF filtered data 346, 348 to be available concurrently for summing 352, 354. However, where separate trees are used for chroma information and luma information, the chroma information and luma information may not be interspersed. Thus, some pixel information may be available before other pixel information for the CC-ALF filter.

In some chroma separate tree (CST) cases, the luma pixel information in a CTU may come before the chroma pixel information in the CTU. Thus, to allow the CB/CR CC-ALF filtered data 342, 344 and CB/CR chroma ALF filtered data 346, 348 to be available concurrently for summing 352, 354, 1 CTU worth of the luma SAO filtered data 304 may be stored in a luma CTU buffer 322 so the luma SAO filtered data 304 is available when the chroma pixel information, in the form of the CB/CR SAO filtered data 310, 314, becomes available. In some cases, 20 KB of external memory may be used for the luma CTU buffer 322 (e.g., CTU of 128×128 and 10 bits per pixel). Including such a buffer may incur an area penalty for coder circuits. Of note, while discussed in the context of CST, it may be understood that the techniques discussed herein may be applicable to other data structures where the data structure, or processing of such data structure, results in one component for the CC-ALF processing being available before another component for the CC-ALF processing.

Additionally, the luma CTU buffer 322 may also place a large demand on memory bandwidth. For example, for a common 4:2:0 chroma sub-sampled frame with a frame height (H) and frame width (W), a total data read per frame for CC-ALF may be H×W pixels for CB+H×W pixels for CR=2(H×W) pixels. Given a frame rate F (e.g., number of frames per second), a read memory bandwidth for CC-ALF would be 2(H×W)×F bits per second. Additionally, assuming there are 10 bits per pixel, a total read memory bandwidth for CC-ALF would be 20(H×W)×F bits per second.

Figure 4:
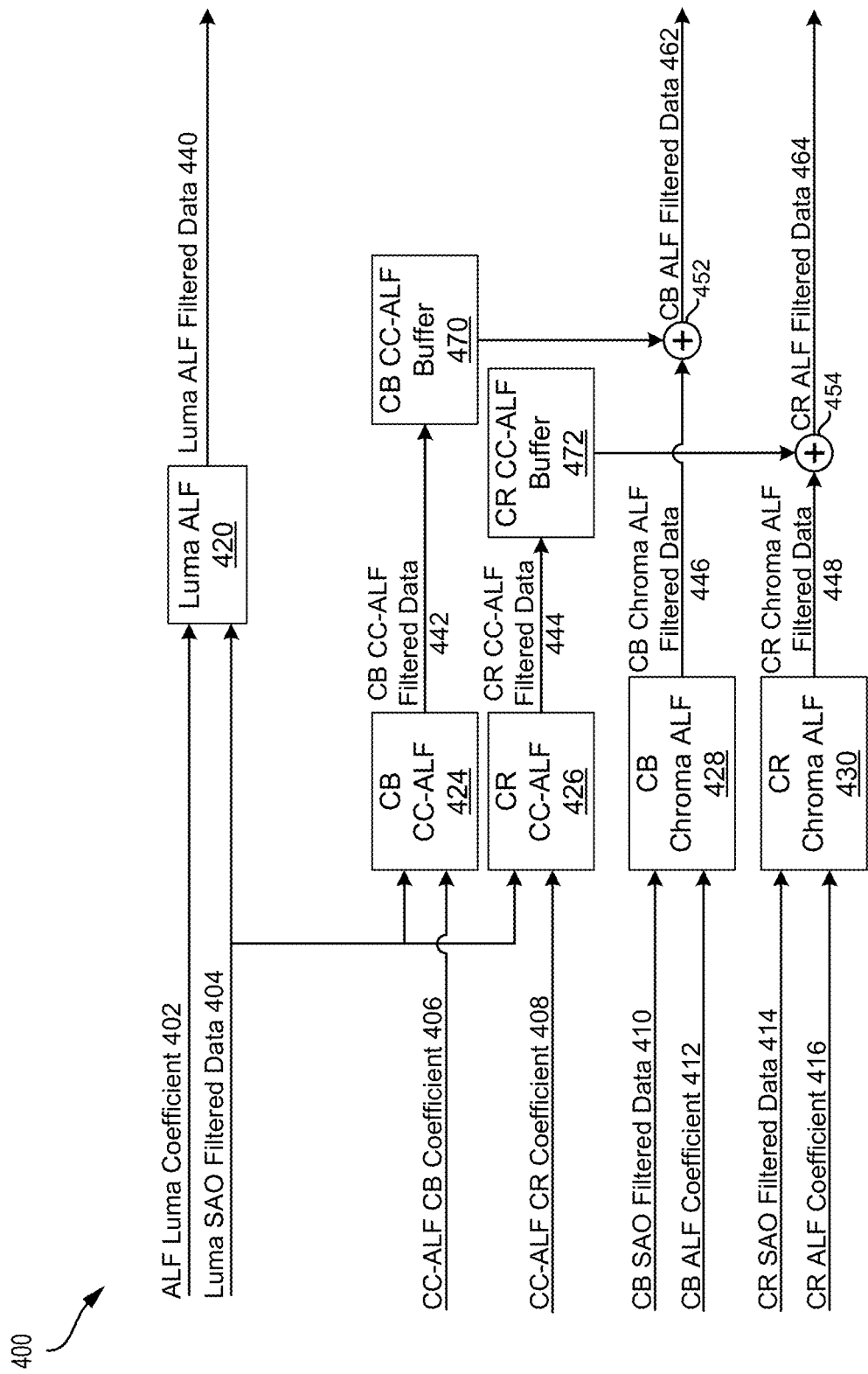
FIG. 4 is a block diagram illustrating an example enhanced ALF filter with an area optimized storage scheme for filtering using a cross-component adaptive loop filter (CC-ALF), in accordance with aspects of the present disclosure.

FIG. 4 is a block diagram 400 illustrating an example enhanced ALF filter with an area optimized storage scheme for CC-ALF, in accordance with aspects of the present disclosure. In diagram 400, a CCL-ALF filter output may be determined for the chroma information (e.g., both CR and CB) and stored in one or more buffers (e.g., cache). For example, luma SAO filtered data 404 for a CTU may be received prior to an availability of CB/CR SAO filtered data 410, 414. As the luma SAO filtered data 404 is received, the luma SAO filtered data 404 and one or more CC-ALF CB coefficients 406 may be passed to a CB CC-ALF filter 424. The CB CC-ALF filter 424 may process the received luma SAO filtered data 404 based on the one or more CC-ALF CB coefficients 406 and output CB CC-ALF filtered data 442. The CB CC-ALF filtered data 442 may be stored in a CB CC-ALF buffer 470.

Similarly, for CR, the received luma SAO filtered data 404 and one or more CC-ALF CR coefficients 408 may be passed to a CR CC-ALF filter 426. The CR CC-ALF filter 426 may process the received luma SAO filtered data 404 based on the one or more CC-ALF CR coefficients 408 and output CR CC-ALF filtered data 444. In some cases, the CB CC-ALF filter 424 and CR-ALF filter 426 may determine a scaled sum of the input chroma value (e.g., one or more CC-ALF CB coefficients 406 and one or more CC-ALF CR coefficients 406R, respectively).

The CR CC-ALF filtered data 444 may be stored in a CR CC-ALF buffer 472. In some cases, the output CB/CR CC-ALF filtered data 442, 444, with 4:2:0 chroma sub-sampling, and clipped to 10 bits per pixel (e.g., between −512 and 511 pixel values) may have a maximum chroma CTU size of 64×64 (e.g., down from a maximum of 128×128 due to chroma sub-sampling). For example, the output CB/CR CC-ALF filtered data 442, 444 has a reduced resolution as compared to the luma SAO filtered data 404 due to the chroma sub-sampling. Thus, the CB/CR CC-ALF filtered data 442, 444 may have a size of 5 KB for each of the CB and CR data, for a total of 10 KB of buffer space for both the CB CC-ALF buffer 470 and CR CC-ALF buffer 472. The CB CC-ALF buffer 470 and CR CC-ALF buffer 472 are memory that is external (e.g., external memory) separate from the output of the luma SAO filter (e.g., a memory, such as cache memory, separate from input and output registers associated with processing circuits or modules, such as those circuits performing the CB/CR CC-ALF filtering or performing the luma SAO filtering).

In some cases, an enhanced ALF filter may be implemented for one CC-ALF process as well as multiple CC-ALF processes. For example, a combined CB/CR CC-ALF may receive the luma SO filtered data 404, along with CC-ALF CB coefficient 406 and CC-ALF CR coefficient 406, to generate either both the CB CC-ALF filtered data 442 and the CR CC-ALF filtered data 444 for storage in a CR/CB CC-ALF buffer, or the combined CB/CR CC-ALF may generate a single combined CB/CR CC-ALF filtered data for storage in a CR/CB CC-ALF buffer. As another example, luma SAO filtered data 404 may be input into the CB CC-ALF 424 with the CC-ALF CB coefficient 406 and resulting CB CC-ALF filtered data 442 stored in a CB CC-ALF buffer 470, while luma SO filtered data 404 may also be stored in a luma CTU buffer, such as luma CTU buffer 322, and then passed into the CR CC-ALF, such as CR CC-ALF 326 to generate CR CC-ALF filtered data, such as CR CC-ALF filtered data 344, which may be combined, without being stored in an external memory, with CR chroma ALF filtered data, such as CR chroma ALF filtered data 348. Of note, while discussed in the context of a CB and CR CC-ALF, it should be understood that the techniques discussed herein may be applied to other chroma values which may be CC-ALF filtered.

Additionally, memory bandwidth may be conserved as storing the CC-ALF filtered data, as compared to storing the luma SAO filtered data, can reduce the memory requirement by up to 50%. For example, with a 4:2:0 chroma sub-sampled frame with a frame height (H) and frame width (W), a total data read per frame for CC-ALF may be $$\frac{1}{2}(H \times W)$$

pixels. With F frames per second, read memory bandwidth may be $$\frac{1}{2}(H \times W) \times F$$

pixels per second, and assuming 10 bits per pixel, a total read memory bandwidth for CC-ALF may be 5(H×W)×F.

In some cases, after the luma pixel information in a CTU is received, the chroma pixel information in the CTU may be received. For example, after the luma SAO filtered data 404 is received for a CTU, the CB/CR SAO filtered data 410, 414 may be received. The CB SAO filtered data 410 and one or more CB ALF coefficients 412 may be input to the CB chroma ALF filter 428. The CB chroma ALF filter 428 may process the CB SAO filtered data 410 based on the one or more CB ALF coefficients 412, and output CB chroma ALF filtered data 446. The corresponding CB CC-ALF filtered data 442 may be retrieved from the CB CC-ALF buffer 470 and the CB chroma ALF filtered data 446 may be summed 452 with the corresponding CB CC-ALF filtered data 442 to generate CB ALF filtered data 462.

Similarly, the CR SAO filtered data 414 and one or more CR ALF coefficients 416 may be input to the CR chroma ALF filter 430. The CR chroma ALF filter 430 may process the CR SAO filtered data 414 based on the one or more CR ALF coefficients 416, and output CR chroma ALF filtered data 448. The corresponding CR CC-ALF filtered data 444 may be retrieved from the CR CC-ALF buffer 472 and the CR chroma ALF filtered data 448 may be summed 454 with the corresponding CR CC-ALF filtered data 444 to generate CR ALF filtered data 464.

In some aspects, one or more ALF luma coefficients 402 and the luma SAO filtered data 404 may be output or passed to a luma ALF filter 420 to produce luma ALF filtered data 440.

Figure 5:
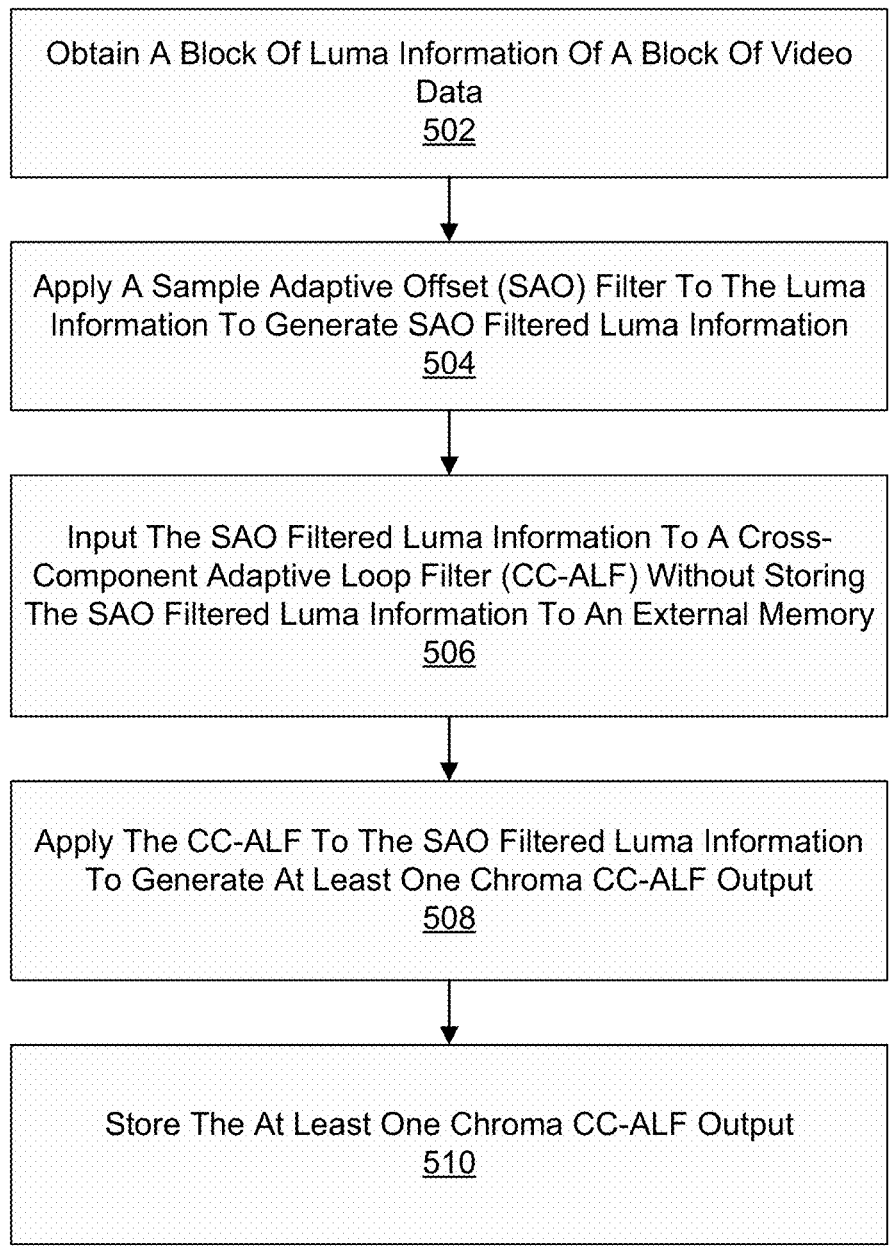
FIG. 5 is a flow diagram illustrating process for processing video data, in accordance with aspects of the present disclosure.

FIG. 5 is a flow diagram illustrating an example of a process 500 for processing video data, in accordance with aspects of the present disclosure. The process 500 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. In some cases, the computing device may be or may include coding device, such as the encoding device 104, the decoding device 112, or a combined encoding device (or codec). The operations of the process 500 may be implemented as software components that are executed and run on one or more processors.

At block 502, the computing device (or component thereof) can obtain a block of luma information for a block of video data. In some cases, the block of luma information are obtained prior to chroma information for the block of video data. In some cases, the block of video data includes a coding tree unit.

At block 504, the computing device (or component thereof) can apply a sample adaptive offset (SAO) filter to the luma information to generate SAO filtered luma information. At block 506, the computing device (or component thereof) can input the SAO filtered luma information to a cross-component adaptive loop filter (CC-ALF) without storing the SAO filtered luma information to an external memory.

At block 508, the computing device (or component thereof) can apply the CC-ALF to the SAO filtered luma information to generate at least one chroma CC-ALF output. In some cases, the computing device (or component thereof) may generate a first chroma CC-ALF output. In some cases, the computing device (or component thereof) may generate a second chroma CC-ALF output. In some cases, the CC-ALF applies sub-sampling to reduce a size of first chroma CC-ALF output and the second chroma CC-ALF output as compared to a size of the SAO filtered luma information. In some cases, the first chroma CC-ALF output includes a first scaled sum chroma value and second chroma CC-ALF output include a second scaled sum chroma value. In some cases, a resolution of the first chroma CC-ALF is reduced as compared to a resolution of the SAO filtered luma information. In some cases, the computing device (or component thereof) may merge the first chroma CC-ALF output with a first chroma adaptive loop filter (ALF) output to generate first chroma ALF filtered data. In some cases, the computing device (or component thereof) may merge the second chroma CC-ALF output with a second chroma ALF output to generate second chroma ALF filtered data. In some cases, the computing device (or component thereof) may retrieve the first chroma CC-ALF output and the second chroma CC-ALF output from the external memory.

At block 510, the computing device (or component thereof) can store the at least one chroma CC-ALF output in the external memory. In some cases, the computing device (or component thereof) may store the first chroma CC-ALF output in the external memory. In some cases, the computing device (or component thereof) may store the second chroma CC-ALF output in the external memory. In some cases, the computing device (or component thereof) may retrieve the stored first chroma CC-ALF output and the second chroma CC-ALF output from the external memory; merge the retrieved first chroma CC-ALF output with a first chroma adaptive loop filter (ALF) output; and merge the retrieved second chroma CC-ALF output with a second chroma ALF output. In some cases, the computing device (or component thereof) may merge the first chroma CC-ALF output with an output of a first chroma adaptive loop filter (ALF) to generate first chroma ALF filtered data; merge the second chroma CC-ALF output with an output of a second chroma adaptive loop filter (ALF) to generate second chroma ALF filtered data; and output the first chroma ALF filtered data and the second chroma ALF filtered data.

The processes (or methods) described herein can be used individually or in any combination. In some implementations, the processes (or methods) described herein can be performed by a computing device or an apparatus, such as the system 100 shown in FIG. 1. For example, the processes can be performed by the encoding device 104 shown in FIG. 1 and FIG. 6, by another video source-side device or video transmission device, by the decoding device 112 shown in FIG. 1 and FIG. 7, and/or by another client-side device, such as a player device, a display, or any other client-side device. In some cases, the computing device or apparatus may include one or more input devices, one or more output devices, one or more processors, one or more microprocessors, one or more microcomputers, and/or other component(s) that is/are configured to carry out the steps of one or more processes described herein.

In some examples, the computing device may include a mobile device, a desktop computer, a server computer and/or server system, or other type of computing device. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure may be applied to video coding in support of any of a variety of multimedia applications, such as wireless (e.g., telecommunications) transmissions, over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 6:
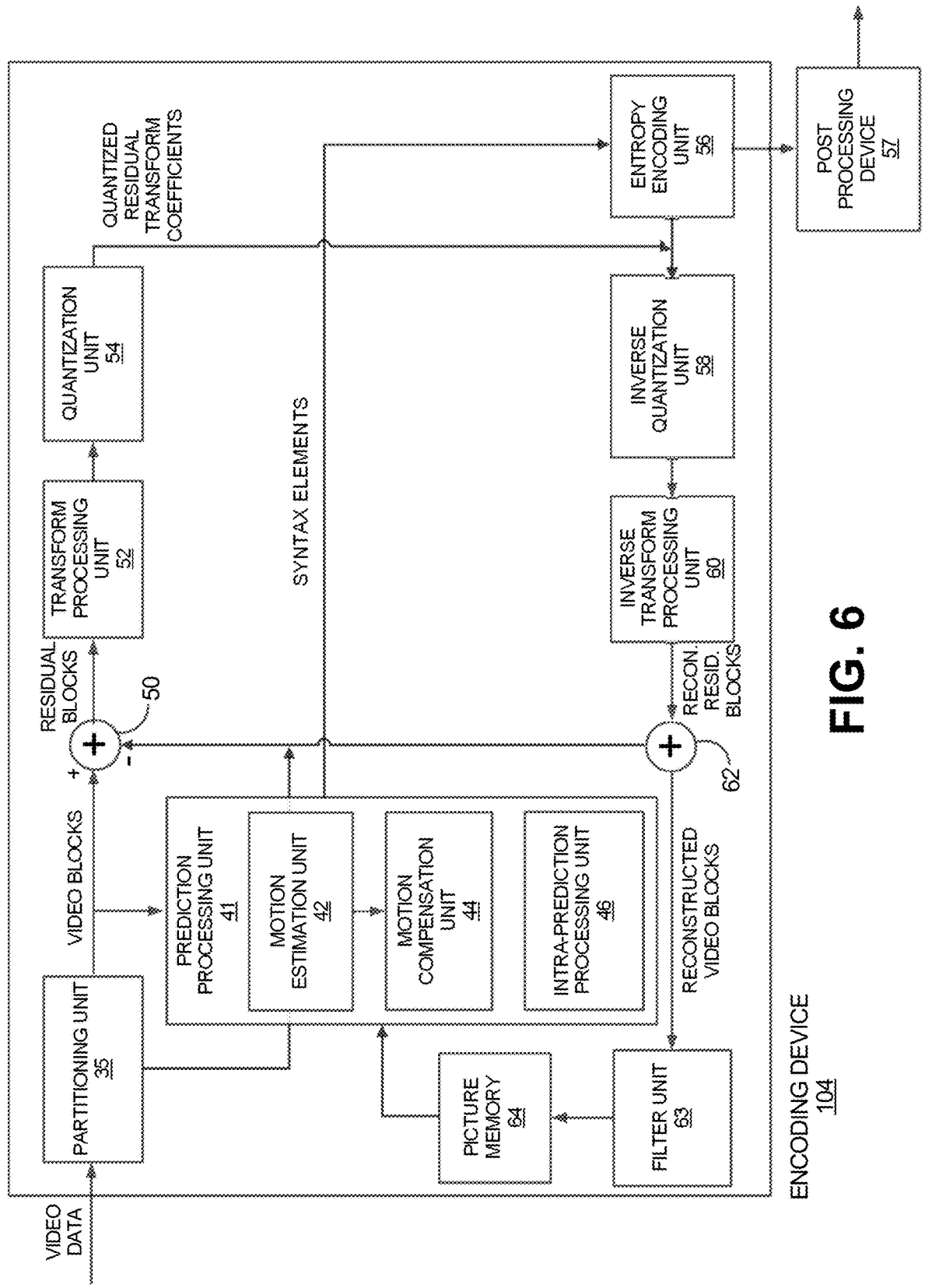
FIG. 6 is a block diagram illustrating an example video encoding device, in accordance with some aspects of the disclosure.
Figure 7:
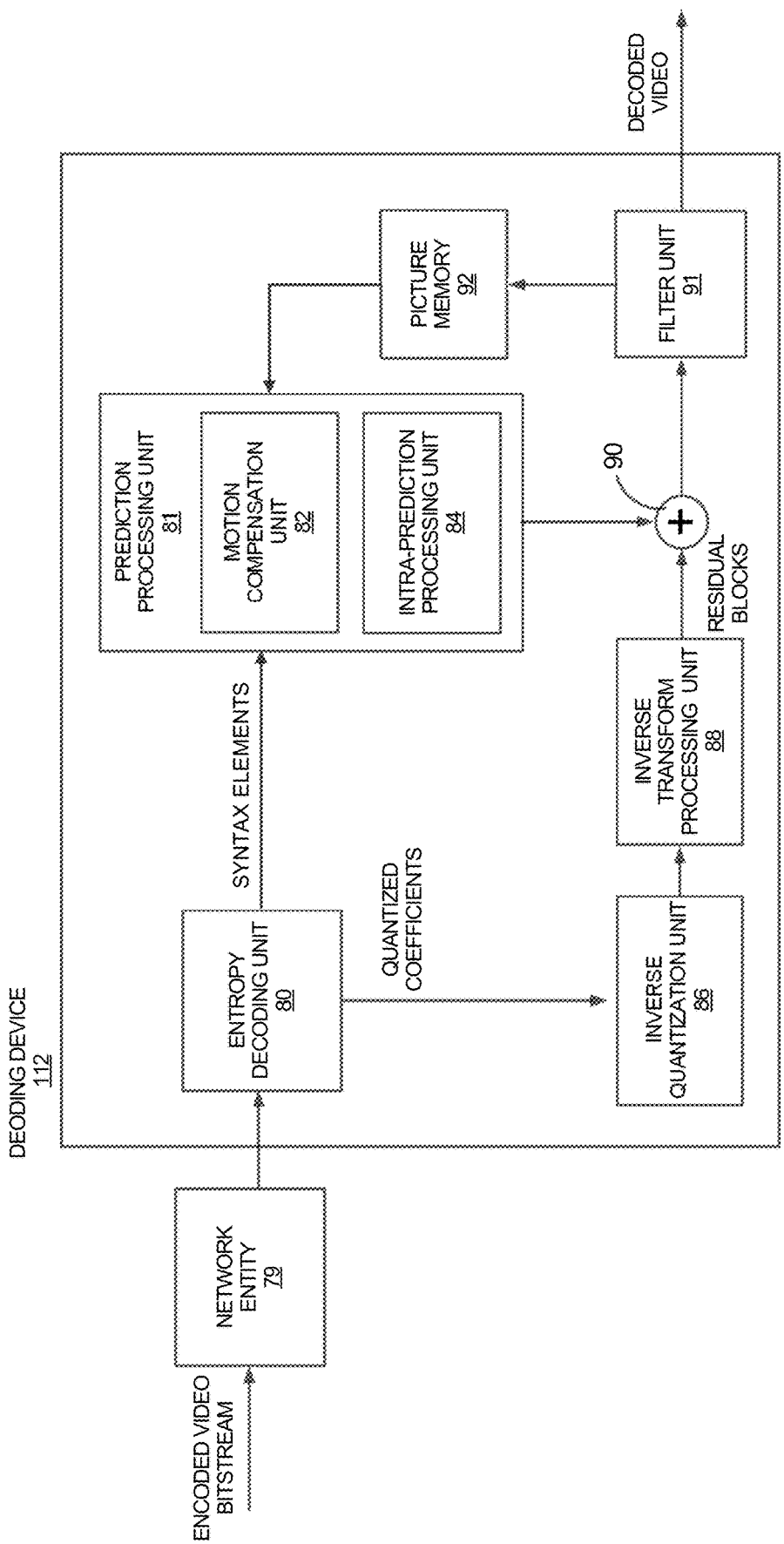
FIG. 7 is a block diagram illustrating an example video decoding device, in accordance with some aspects of the disclosure.

Specific details of the encoding device 104 and the decoding device 112 are shown in FIG. 6 and FIG. 7, respectively. FIG. 6 is a block diagram illustrating an example encoding device 104 that may implement one or more of the techniques described in this disclosure. Encoding device 104 may, for example, generate the syntax elements and/or structures described herein (e.g., the syntax elements and/or structures of a green metadata, such as Complexity Metrics (CM), or other syntax elements and/or structures). Encoding device 104 may perform intra-prediction and inter-prediction coding of video blocks within video slices, tiles, sub-pictures, etc. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 6 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 6, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by merging (e.g., adding, summing) the residual block to a predictive block of one of the reference pictures within a reference picture list. Motion compensation unit 44 may also apply one or more interpolation filters to the reconstructed residual block to calculate sub-integer pixel values for use in motion estimation. Summer 62 merges the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 6 represents an example of a video encoder configured to perform any of the techniques described herein. In some cases, some of the techniques of this disclosure may also be implemented by post processing device 57.

FIG. 7 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 6.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 7 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 7 represents an example of a video decoder configured to perform any of the techniques described herein.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for processing video data, comprising: at least one memory; and at least one processor coupled to the at least one memory, the at least one processor being configured to: obtain a block of luma information for a block of video data; apply a sample adaptive offset (SAO) filter to the luma information to generate SAO filtered luma information; input the SAO filtered luma information to a cross-component adaptive loop filter (CC-ALF) without storing the SAO filtered luma information to an external memory; apply the CC-ALF to the SAO filtered luma information to generate a first chroma CC-ALF output and a second chroma CC-ALF output; and store the first chroma CC-ALF output and the second chroma CC-ALF output in the external memory.

Aspect 2. The apparatus of aspect 1, wherein the at least one processor is further configured to: retrieve the stored first chroma CC-ALF output and the second chroma CC-ALF output from the external memory; merge the retrieved first chroma CC-ALF output with a first chroma adaptive loop filter (ALF) output; and merge the retrieved second chroma CC-ALF output with a second chroma ALF output.

Aspect 3. The apparatus of any of aspects 1-2, wherein the block of luma information are obtained prior to chroma information for the block of video data.

Aspect 4. The apparatus of any of aspects 1-3, wherein the at least one processor is further configured to: merge the first chroma CC-ALF output with an output of a first chroma adaptive loop filter (ALF) to generate first chroma ALF filtered data; merge the second chroma CC-ALF output with an output of a second chroma adaptive loop filter (ALF) to generate second chroma ALF filtered data; and output the first chroma ALF filtered data and the second chroma ALF filtered data.

Aspect 5. The apparatus of any of aspects 1-4, wherein the block of video data comprises a coding tree unit.

Aspect 6. The apparatus of any of aspects 1-5, wherein the CC-ALF applies sub-sampling to reduce a size of first chroma CC-ALF output and the second chroma CC-ALF output as compared to a size of the SAO filtered luma information.

Aspect 7. The apparatus of aspect 6, wherein the first chroma CC-ALF output comprises a first scaled sum chroma value and second chroma CC-ALF output comprise a second scaled sum chroma value.

Aspect 8. The apparatus of any of aspects 6 or 7, wherein a resolution of the first chroma CC-ALF is reduced as compared to a resolution of the SAO filtered luma information.

Aspect 9. The apparatus of any of aspects 1-8, wherein the apparatus includes a decoder.

Aspect 10. The apparatus of any of aspects 1-9, wherein the apparatus includes an encoder.

Aspect 11. The apparatus of any of aspects 1-10, further comprising a display configured to display one or more output pictures.

Aspect 12. The apparatus of any of aspects 1-11, further comprising a camera configured to capture one or more pictures.

Aspect 13. The apparatus of any of any of aspects 1-12, wherein the apparatus is a mobile device.

Aspect 14. A method for processing video data, comprising: obtaining a block of luma information for a block of video data; applying a sample adaptive offset (SAO) filter to the luma information to generate SAO filtered luma information; inputting the SAO filtered luma information to a cross-component adaptive loop filter (CC-ALF) without storing the SAO filtered luma information to an external memory; applying the CC-ALF to the SAO filtered luma information to generate a first chroma CC-ALF output and a second chroma CC-ALF output; and storing the first chroma CC-ALF output and the second chroma CC-ALF output in the external memory.

Aspect 15. The method of aspect 14, further comprising: retrieving the stored first chroma CC-ALF output and the second chroma CC-ALF output from the external memory; merging the retrieved first chroma CC-ALF output with a first chroma adaptive loop filter (ALF) output; and merging the retrieved second chroma CC-ALF output with a second chroma ALF output.

Aspect 16. The method of any of aspects 14-15, wherein the block of luma information are obtained prior to chroma information for the block of video data.

Aspect 17. The method of any of aspects 14-16, further comprising: merging the first chroma CC-ALF output with an output of a first chroma adaptive loop filter (ALF) to generate first chroma ALF filtered data; merging the second chroma CC-ALF output with an output of a second chroma adaptive loop filter (ALF) to generate second chroma ALF filtered data; and outputting the first chroma ALF filtered data and the second chroma ALF filtered data.

Aspect 18. The method of any of aspects 14-17, wherein the block of video data comprises a coding tree unit.

Aspect 19. The method of any of aspects 14-18, wherein the CC-ALF applies sub-sampling to reduce a size of first chroma CC-ALF output and the second chroma CC-ALF output as compared to a size of the SAO filtered luma information.

Aspect 20. The method of aspect 19, wherein the first chroma CC-ALF output comprises a first scaled sum chroma value and second chroma CC-ALF output comprise a second scaled sum chroma value.

Aspect 21. The method of any of aspects 19 or 20, wherein a resolution of the first chroma CC-ALF is reduced as compared to a resolution of the SAO filtered luma information.

Aspect 22. A non-transitory computer-readable medium having stored thereon instructions that, when executed by at least one processor, cause the at least one processor to: obtain a block of luma information for a block of video data; apply a sample adaptive offset (SAO) filter to the luma information to generate SAO filtered luma information; input the SAO filtered luma information to a cross-component adaptive loop filter (CC-ALF) without storing the SAO filtered luma information to an external memory; apply the CC-ALF to the SAO filtered luma information to generate a first chroma CC-ALF output and a second chroma CC-ALF output; and store the first chroma CC-ALF output and the second chroma CC-ALF output in the external memory.

Aspect 23. The non-transitory computer-readable medium of aspect 22, wherein the instructions further cause the at least one processor to: retrieve the stored first chroma CC-ALF output and the second chroma CC-ALF output from the external memory; merge the retrieved first chroma CC-ALF output with a first chroma adaptive loop filter (ALF) output; and merge the retrieved second chroma CC-ALF output with a second chroma ALF output.

Aspect 24. The non-transitory computer-readable medium of any of aspects 22-23, wherein the block of luma information are obtained prior to chroma information for the block of video data.

Aspect 25. The non-transitory computer-readable medium of any of aspects 22-24, wherein the instructions further cause the at least one processor to: merge the first chroma CC-ALF output with an output of a first chroma adaptive loop filter (ALF) to generate first chroma ALF filtered data; merge the second chroma CC-ALF output with an output of a second chroma adaptive loop filter (ALF) to generate second chroma ALF filtered data; and output the first chroma ALF filtered data and the second chroma ALF filtered data.

Aspect 26. The non-transitory computer-readable medium of any of aspects 22-25, wherein the block of video data comprises a coding tree unit.

Aspect 27. The non-transitory computer-readable medium of any of aspects 22-26, wherein the CC-ALF applies sub-sampling to reduce a size of first chroma CC-ALF output and the second chroma CC-ALF output as compared to a size of the SAO filtered luma information.

Aspect 28. The non-transitory computer-readable medium of aspect 27, wherein the first chroma CC-ALF output comprises a first scaled sum chroma value and second chroma CC-ALF output comprise a second scaled sum chroma value.

Aspect 29. The non-transitory computer-readable medium of aspect 27, wherein a resolution of the first chroma CC-ALF is reduced as compared to a resolution of the SAO filtered luma information.

Aspect 30. An apparatus for processing video data, comprising one or more means for performing operations according to Aspects 1 to 29, or any combination thereof.

Aspect 31. An apparatus for processing video data, comprising: means for obtaining a block of luma information for a block of video data; means for applying a sample adaptive offset (SAO) filter to the luma information to generate SAO filtered luma information; means for inputting the SAO filtered luma information to a cross-component adaptive loop filter (CC-ALF) without storing the SAO filtered luma information to an external memory; means for applying the CC-ALF to the SAO filtered luma information to generate a first chroma CC-ALF output and a second chroma CC-ALF output; and means for storing the first chroma CC-ALF output and the second chroma CC-ALF output in the external memory.

Aspect 32. The apparatus of aspect 31, wherein the CC-ALF filters the SAO filtered luma information to determine a residual for a chroma component.

Aspect 33. The apparatus of any one of aspects 31 or 32, wherein the external memory comprises a memory separate from output registers of the SAO filter and input registers of the CC-ALF.

Aspect 34. The apparatus of any one of aspects 31 to 33, wherein the external memory comprises cache memory.

Aspect 35. An apparatus for processing video data, comprising: at least one memory; and at least one processor coupled to the at least one memory, the at least one processor being configured to: obtain a block of luma information for a block of video data; apply a sample adaptive offset (SAO) filter to the luma information to generate SAO filtered luma information; input the SAO filtered luma information to a cross-component adaptive loop filter (CC-ALF) without storing the SAO filtered luma information to an external memory; apply the CC-ALF to the SAO filtered luma information to generate at least one chroma CC-ALF output; and store the at least one chroma CC-ALF output in the external memory.

Aspect 36. The apparatus of Aspect 35, wherein, to generate at least one chroma CC-ALF output, the at least one processor is configured to: generate a first chroma CC-ALF output; and generate a second chroma CC-ALF output; and wherein, to store the at least one chroma CC-ALF output, the at least one processor is configured to: store the first chroma CC-ALF output in the external memory; and store the second chroma CC-ALF output in the external memory.

Aspect 37. The apparatus of Aspect 36, wherein the at least one processor is further configured to: merge the first chroma CC-ALF output with a first chroma adaptive loop filter (ALF) output to generate first chroma ALF filtered data; and merge the second chroma CC-ALF output with a second chroma ALF output to generate second chroma ALF filtered data.

Aspect 38. The apparatus of Aspect 37, wherein the at least one processor is further configured to retrieve the first chroma CC-ALF output and the second chroma CC-ALF output from the external memory.

Aspect 39. The apparatus of any of Aspects 36-38, wherein the CC-ALF applies sub-sampling to reduce a size of first chroma CC-ALF output and the second chroma CC-ALF output as compared to a size of the SAO filtered luma information.

Aspect 40. The apparatus of Aspect 39, wherein the first chroma CC-ALF output comprises a first scaled sum chroma value and second chroma CC-ALF output comprise a second scaled sum chroma value.

Aspect 41. The apparatus of Aspect 39, wherein a resolution of the first chroma CC-ALF output is reduced as compared to a resolution of the SAO filtered luma information.

Aspect 42. The apparatus of any of Aspects 35-41, wherein the block of video data comprises a coding tree unit.

Aspect 43. The apparatus of any of Aspects 35-42, wherein the at least one processor is configured to obtain the block of luma information prior to chroma information for the block of video data.

Aspect 44. The apparatus of Aspect any of Aspects 35-43, wherein the apparatus includes a decoder.

Aspect 45. The apparatus of Aspect any of Aspects 35-44, wherein the apparatus includes an encoder.

Aspect 46. The apparatus of any of Aspects 35-45, further comprising: a display configured to display one or more output pictures; and a camera configured to capture one or more pictures.

Aspect 47. The apparatus of any of Aspects 35-46, wherein the apparatus is a mobile device.

Aspect 48. A method for processing video data, comprising: obtaining a block of luma information for a block of video data; applying a sample adaptive offset (SAO) filter to the luma information to generate SAO filtered luma information; inputting the SAO filtered luma information to a cross-component adaptive loop filter (CC-ALF) without storing the SAO filtered luma information to an external memory; applying the CC-ALF to the SAO filtered luma information to generate at least one chroma CC-ALF output; and storing the at least one chroma CC-ALF output in the external memory.

Aspect 49. The method of Aspect 48, wherein generating the at least one chroma CC-ALF output comprises: generating a first chroma CC-ALF output; and generating a second chroma CC-ALF output; and wherein storing the at least one chroma CC-ALF output comprises: storing the first chroma CC-ALF output in the external memory; and storing the second chroma CC-ALF output in the external memory.

Aspect 50. The method of Aspect 49, further comprising: merging the first chroma CC-ALF output with a first chroma adaptive loop filter (ALF) output to generate first chroma ALF filtered data; and merging the second chroma CC-ALF output with a second chroma ALF output to generate second chroma ALF filtered data.

Aspect 51. The method of any of Aspects 49 or 50, further comprising retrieving the first chroma CC-ALF output and the second chroma CC-ALF output from the external memory.

Aspect 52. The method of any of Aspects 49-51, wherein the CC-ALF applies sub-sampling to reduce a size of first chroma CC-ALF output and the second chroma CC-ALF output as compared to a size of the SAO filtered luma information.

Aspect 53. The method of any of Aspects 49-52, wherein the first chroma CC-ALF output comprises a first scaled sum chroma value and second chroma CC-ALF output comprise a second scaled sum chroma value.

Aspect 54. The method of any of Aspects 49-53, wherein a resolution of the first chroma CC-ALF output is reduced as compared to a resolution of the SAO filtered luma information.

Aspect 55. The method of any of Aspects 48-54, wherein the block of luma information is obtained prior to chroma information for the block of video data.

Aspect 56. The method of any of Aspects 47-55, wherein the block of video data comprises a coding tree unit.

Aspect 57. A non-transitory computer-readable medium having stored thereon instructions that, when executed by at least one processor, cause the at least one processor to: obtain a block of luma information for a block of video data; apply a sample adaptive offset (SAO) filter to the luma information to generate SAO filtered luma information; input the SAO filtered luma information to a cross-component adaptive loop filter (CC-ALF) without storing the SAO filtered luma information to an external memory; apply the CC-ALF to the SAO filtered luma information to generate at least one chroma CC-ALF output; and store the at least one chroma CC-ALF output in the external memory.

Aspect 58. The non-transitory computer-readable medium of Aspect 57, wherein, to generate at least one chroma CC-ALF output, the instructions cause the at least one processor to: generate a first chroma CC-ALF output; and generate a second chroma CC-ALF output; and wherein, to store the at least one chroma CC-ALF output, the instructions cause the at least one processor to: store the first chroma CC-ALF output in the external memory; and store the second chroma CC-ALF output in the external memory.

Aspect 59. The non-transitory computer-readable medium of Aspect 58, wherein the instructions further cause the at least one processor to: merge the first chroma CC-ALF output with a first chroma adaptive loop filter (ALF) output to generate first chroma ALF filtered data; and merge the second chroma CC-ALF output with a second chroma ALF output to generate second chroma ALF filtered data.

Aspect 60. The non-transitory computer-readable medium of Aspect 59, wherein the instructions further cause the at least one processor to retrieve the first chroma CC-ALF output and the second chroma CC-ALF output from the external memory.

Aspect 61. The non-transitory computer-readable medium of any of Aspects 58-60, wherein the CC-ALF applies sub-sampling to reduce a size of first chroma CC-ALF output and the second chroma CC-ALF output as compared to a size of the SAO filtered luma information.

Aspect 62. The non-transitory computer-readable medium of any of Aspects 58-61, wherein the first chroma CC-ALF output comprises a first scaled sum chroma value and second chroma CC-ALF output comprise a second scaled sum chroma value.

Aspect 63. The non-transitory computer-readable medium of any of Aspects 58-62, wherein a resolution of the first chroma CC-ALF output is reduced as compared to a resolution of the SAO filtered luma information.

Aspect 64. The non-transitory computer-readable medium of any of Aspects 57-63, wherein the block of luma information is obtained prior to chroma information for the block of video data.

Aspect 65. The non-transitory computer-readable medium of any of Aspects 57-64, wherein the block of video data comprises a coding tree unit.

Aspect 66. An apparatus for processing video data, comprising: means for obtaining a block of luma information for a block of video data; means for applying a sample adaptive offset (SAO) filter to the luma information to generate SAO filtered luma information; means for inputting the SAO filtered luma information to a cross-component adaptive loop filter (CC-ALF) without storing the SAO filtered luma information to an external memory; means for applying the CC-ALF to the SAO filtered luma information to generate at least one chroma CC-ALF output; and means for storing the at least one chroma CC-ALF output in the external memory.

Aspect 67. The apparatus of Aspect 66, comprising one or more means for performing operations according to any of Aspects 48 to 56, or any combination thereof.

What is claimed is:
1. An apparatus for processing video data, comprising:
at least one memory configured to store the video data; and
at least one processor coupled to the at least one memory, the at least one processor being configured to:
obtain a block of luma information for a block of the video data;
apply a sample adaptive offset (SAO) filter to the luma information to generate SAO filtered luma information;
input the SAO filtered luma information to a cross-component adaptive loop filter (CC-ALF) without storing the SAO filtered luma information to an external memory, wherein the SAO filtered luma information is generated prior to chroma information for the block of video data;
apply the CC-ALF to the SAO filtered luma information to generate at least one chroma CC-ALF output;
store the at least one chroma CC-ALF output in the external memory, wherein the external memory is separate from an output of a circuit generating the SAO filtered luma information; and
merge the at least one chroma CC-ALF output from the external memory with at least one chroma adaptive loop filter (ALF) output to generate first chroma ALF filtered data.

2. The apparatus of claim 1, wherein, to generate at least one chroma CC-ALF output, the at least one processor is configured to:
generate a first chroma CC-ALF output; and
generate a second chroma CC-ALF output; and wherein, to store the at least one chroma CC-ALF output, the at least one processor is configured to:

store the first chroma CC-ALF output in the external memory; and store the second chroma CC-ALF output in the external memory.

3. The apparatus of claim 2, wherein the at least one processor is further configured to:
merge the first chroma CC-ALF output with a first chroma adaptive loop filter (ALF) output to generate first chroma ALF filtered data; and
merge the second chroma CC-ALF output with a second chroma ALF output to generate second chroma ALF filtered data.

4. The apparatus of claim 3, wherein the at least one processor is further configured to retrieve the first chroma CC-ALF output and the second chroma CC-ALF output from the external memory.

5. The apparatus of claim 2, wherein the CC-ALF applies sub-sampling to reduce a size of first chroma CC-ALF output and the second chroma CC-ALF output as compared to a size of the SAO filtered luma information.

6. The apparatus of claim 5, wherein the first chroma CC-ALF output comprises a first scaled sum chroma value and second chroma CC-ALF output comprise a second scaled sum chroma value.

7. The apparatus of claim 5, wherein a resolution of the first chroma CC-ALF output is reduced as compared to a resolution of the SAO filtered luma information.

8. The apparatus of claim 1, wherein the block of video data comprises a coding tree unit.

9. The apparatus of claim 1, wherein the at least one processor is configured to obtain the block of luma information prior to chroma information for the block of video data.

10. The apparatus of claim 1, wherein the apparatus includes a decoder.

11. The apparatus of claim 1, wherein the apparatus includes an encoder.

12. The apparatus of claim 1, further comprising:
a display configured to display one or more output pictures; and
a camera configured to capture one or more pictures.

13. The apparatus of claim 1, wherein the apparatus is a mobile device.

14. A method for processing video data, comprising:
obtaining a block of luma information for a block of video data;
applying a sample adaptive offset (SAO) filter to the luma information to generate SAO filtered luma information;
inputting the SAO filtered luma information to a cross-component adaptive loop filter (CC-ALF) without storing the SAO filtered luma information to an external memory, wherein the SAO filtered luma information is generated prior to chroma information for the block of video data;
applying the CC-ALF to the SAO filtered luma information to generate at least one chroma CC-ALF output;
storing the at least one chroma CC-ALF output in the external memory, wherein the external memory is separate from an output of a circuit generating the SAO filtered luma information; and
merge the at least one chroma CC-ALF output from the external memory with at least one chroma adaptive loop filter (ALF) output to generate first chroma ALF filtered data.

15. The method of claim 14, wherein generating the at least one chroma CC-ALF output comprises:
generating a first chroma CC-ALF output; and
generating a second chroma CC-ALF output; and wherein storing the at least one chroma CC-ALF output comprises:
storing the first chroma CC-ALF output in the external memory; and
storing the second chroma CC-ALF output in the external memory.

16. The method of claim 15, further comprising:
merging the first chroma CC-ALF output with a first chroma adaptive loop filter (ALF) output to generate first chroma ALF filtered data; and
merging the second chroma CC-ALF output with a second chroma ALF output to generate second chroma ALF filtered data.

17. The method of claim 16, further comprising retrieving the first chroma CC-ALF output and the second chroma CC-ALF output from the external memory.

18. The method of claim 15, wherein the CC-ALF applies sub-sampling to reduce a size of first chroma CC-ALF output and the second chroma CC-ALF output as compared to a size of the SAO filtered luma information.

19. The method of claim 18, wherein the first chroma CC-ALF output comprises a first scaled sum chroma value and second chroma CC-ALF output comprise a second scaled sum chroma value.

20. The method of claim 18, wherein a resolution of the first chroma CC-ALF output is reduced as compared to a resolution of the SAO filtered luma information.

21. The method of claim 14, wherein the block of luma information is obtained prior to chroma information for the block of video data.

22. A non-transitory computer-readable medium having stored thereon instructions that, when executed by at least one processor, cause the at least one processor to:
obtain a block of luma information for a block of video data;
apply a sample adaptive offset (SAO) filter to the luma information to generate SAO filtered luma information;
input the SAO filtered luma information to a cross-component adaptive loop filter (CC-ALF) without storing the SAO filtered luma information to an external memory, wherein the SAO filtered luma information is generated prior to chroma information for the block of video data;
apply the CC-ALF to the SAO filtered luma information to generate at least one chroma CC-ALF output;
store the at least one chroma CC-ALF output in the external memory, wherein the external memory is separate from an output of a circuit generating the SAO filtered luma information, and
merge the at least one chroma CC-ALF output from the external memory with at least one chroma adaptive loop filter (ALF) output to generate first chroma ALF filtered data.

23. The non-transitory computer-readable medium of claim 22, wherein, to generate at least one chroma CC-ALF output, the instructions cause the at least one processor to:
generate a first chroma CC-ALF output; and
generate a second chroma CC-ALF output; and wherein, to store the at least one chroma CC-ALF output, the instructions cause the at least one processor to:
store the first chroma CC-ALF output in the external memory; and store the second chroma CC-ALF output in the external memory.

24. The non-transitory computer-readable medium of claim 23, wherein the instructions further cause the at least one processor to:
   merge the first chroma CC-ALF output with a first chroma adaptive loop filter (ALF) output to generate first chroma ALF filtered data; and
   merge the second chroma CC-ALF output with a second chroma ALF output to generate second chroma ALF filtered data.

25. The non-transitory computer-readable medium of claim 24, wherein the instructions further cause the at least one processor to retrieve the first chroma CC-ALF output and the second chroma CC-ALF output from the external memory.

26. The non-transitory computer-readable medium of claim 23, wherein the CC-ALF applies sub-sampling to reduce a size of first chroma CC-ALF output and the second chroma CC-ALF output as compared to a size of the SAO filtered luma information.

27. The non-transitory computer-readable medium of claim 26, wherein the first chroma CC-ALF output comprises a first scaled sum chroma value and second chroma CC-ALF output comprise a second scaled sum chroma value.

28. The non-transitory computer-readable medium of claim 26, wherein a resolution of the first chroma CC-ALF output is reduced as compared to a resolution of the SAO filtered luma information.

29. The non-transitory computer-readable medium of claim 22, wherein the block of luma information is obtained prior to chroma information for the block of video data.

30. The apparatus of claim 1, further comprising the external memory.

* * * * *